US008489894B2

(12) United States Patent
Comrie et al.

(10) Patent No.: US 8,489,894 B2
(45) Date of Patent: Jul. 16, 2013

(54) REFERENCE TOKEN SERVICE

(75) Inventors: Stewart Comrie, The Woodlands, TX (US); Eric Carpenter, Austin, TX (US); Gary Epple, Austin, TX (US)

(73) Assignee: Paymetric, Inc., Roswell, GA (US)

( * ) Notice: Subject to any disclaimer, the term of this patent is extended or adjusted under 35 U.S.C. 154(b) by 0 days.

(21) Appl. No.: 13/116,993

(22) Filed: May 26, 2011

(65) Prior Publication Data

US 2011/0307714 A1  Dec. 15, 2011

Related U.S. Application Data

(60) Provisional application No. 61/348,565, filed on May 26, 2010.

(51) Int. Cl.
*G06F 21/72* (2013.01)

(52) U.S. Cl.
USPC .......................................... 713/189; 713/172

(58) Field of Classification Search
USPC ........... 713/189, 193, 152, 172, 183; 705/908
See application file for complete search history.

(56) References Cited

U.S. PATENT DOCUMENTS

| | | | |
|---|---|---|---|
| 5,850,442 A * | 12/1998 | Muftic | 705/65 |
| 6,128,482 A * | 10/2000 | Nixon et al. | 455/414.1 |
| 6,236,981 B1 * | 5/2001 | Hill | 705/67 |
| 6,314,517 B1 | 11/2001 | Moses et al. | |
| 6,327,578 B1 * | 12/2001 | Linehan | 705/65 |
| 7,127,236 B2 * | 10/2006 | Khan et al. | 455/414.1 |
| 7,299,364 B2 * | 11/2007 | Noble et al. | 713/189 |
| 8,312,023 B2 * | 11/2012 | Shields et al. | 707/742 |
| 8,321,685 B2 * | 11/2012 | Bowers | 713/186 |
| 2003/0014629 A1 | 1/2003 | Zuccherato | |
| 2003/0061170 A1 | 3/2003 | Uzo | |
| 2003/0191970 A1 | 10/2003 | Devine et al. | |
| 2004/0098595 A1 | 5/2004 | Aupperle et al. | |
| 2005/0132222 A1 | 6/2005 | Petrovic | |
| 2005/0138389 A1 * | 6/2005 | Catherman et al. | 713/185 |
| 2006/0235803 A1 | 10/2006 | Romney | |
| 2007/0038525 A1 * | 2/2007 | Waldvogel et al. | 705/26 |
| 2008/0077803 A1 * | 3/2008 | Leach et al. | 713/189 |
| 2008/0263645 A1 | 10/2008 | Renter et al. | |
| 2010/0257612 A1 * | 10/2010 | McGuire et al. | 726/26 |
| 2011/0060927 A1 * | 3/2011 | Fillingim et al. | 713/320 |
| 2011/0093397 A1 * | 4/2011 | Carlson et al. | 705/67 |
| 2012/0239565 A1 * | 9/2012 | Davis et al. | 705/41 |
| 2012/0253974 A1 * | 10/2012 | Haikonen et al. | 705/26.41 |

* cited by examiner

*Primary Examiner* — Eleni Shiferaw
*Assistant Examiner* — Abu Sholeman
(74) *Attorney, Agent, or Firm* — Morris, Manning & Martin, LLP; Daniel E. Sineway, Esq.

(57) ABSTRACT

A reference token service (RTS) is disclosed. Generally, the RTS receives sensitive data items from trusted source applications associated with particular merchants. Upon receipt of a particular sensitive data item from a particular merchant, the RTS identifies one or more reference token pools corresponding to the merchant. Each reference token pool includes a plurality of reference tokens comprising formats and data structures corresponding to sensitive data items and compatible with the merchant. The RTS receives a crypto token associated with the sensitive data item which may not conform to the merchant's formatting or data requirements. The RTS associates the crypto token with a reference token corresponding to the merchant, which is provided to the merchant for sharing and retrieval of the sensitive data item amongst the merchant's various applications.

14 Claims, 8 Drawing Sheets

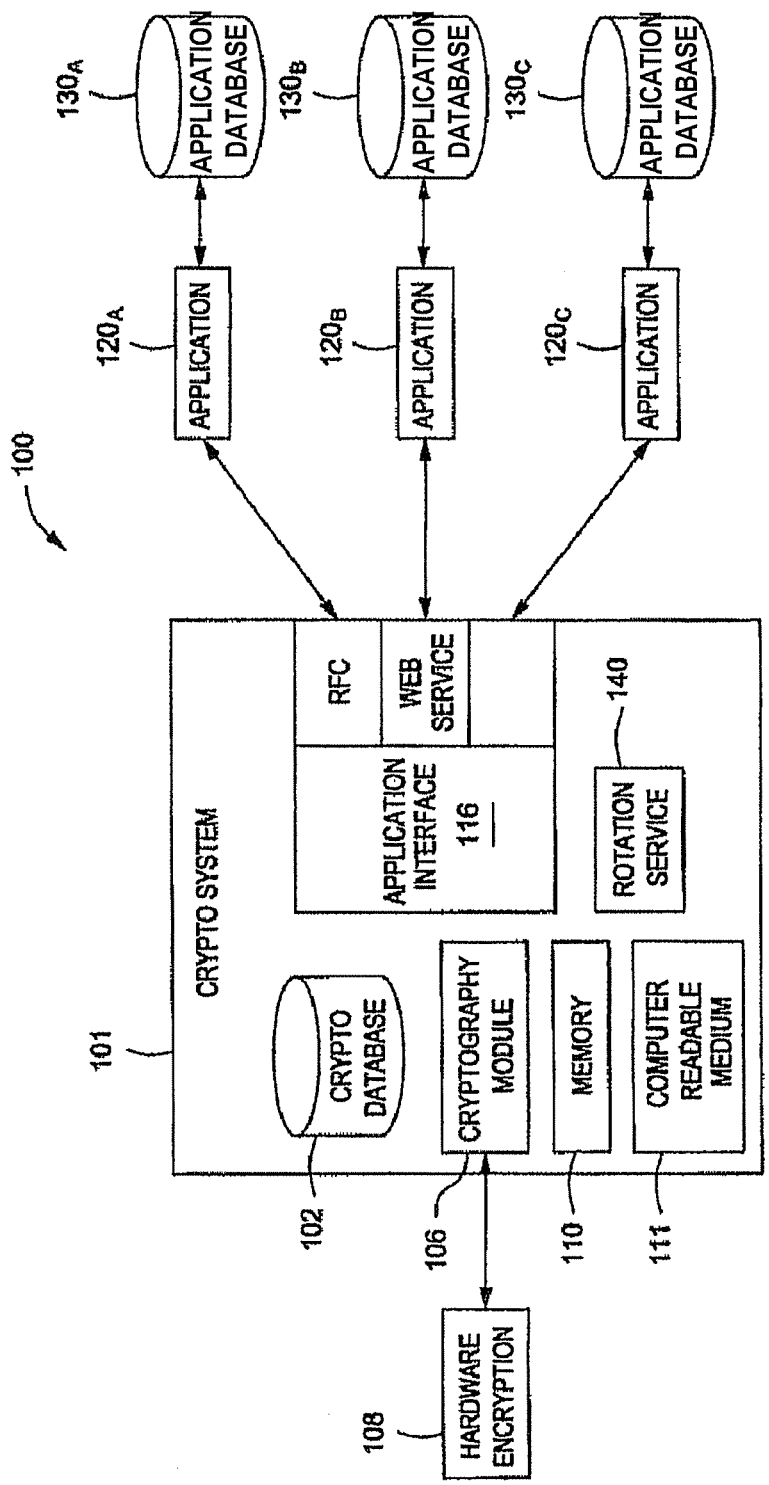
FIG. 1 - Enterprise Software Environment

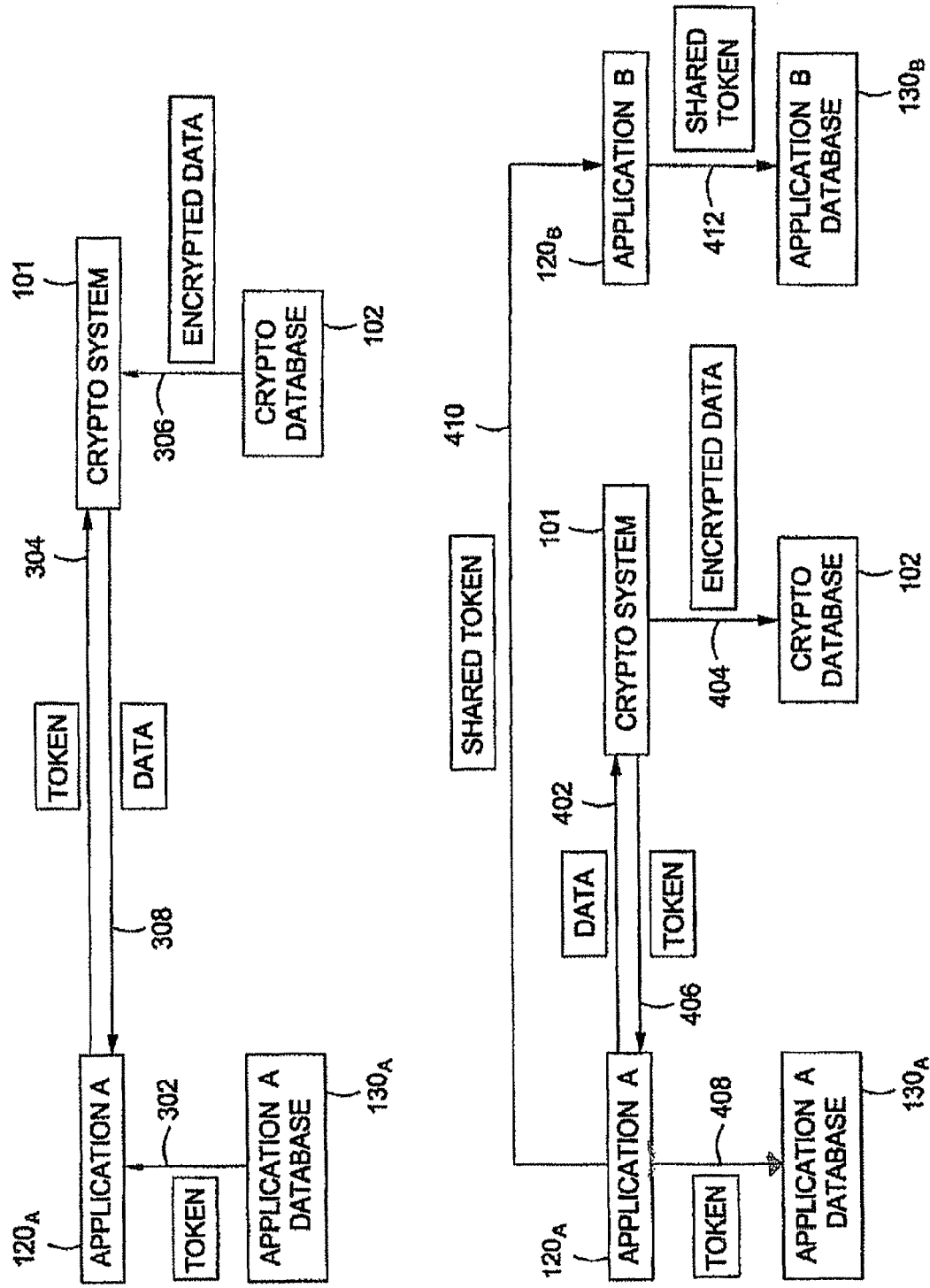

REFERENCE TOKEN SERVICE

CROSS-REFERENCE TO RELATED APPLICATIONS

This application claims benefit under 35 U.S.C. §119(e) of and priority to U.S. Provisional Patent Application No. 61/348,565, filed May 26, 2010, and entitled "Reference Token Service", which is incorporated herein by reference as if set forth herein in its entirety.

BACKGROUND

Typically, conventional data rotation services are tightly integrated within an application and perform services only for that particular application. A tightly integrated architecture might not be suitable for managing encrypted data in high-availability, multiple application software environments.

One problem with conventional crypto management services arises when transmitting or sharing data among separate-but-related applications. One application might not have the capability to decrypt data that has been encrypted by another application. For example, one application might use a different encryption technology than another application. If this is the case, then the applications must share data in unencrypted form.

Another problem with conventional crypto management services is that the extra step of decrypting and re-encrypting the data can cause extra load on the systems and reduce performance of an application that is using the same resources as the crypto management service. Such performance degradation may be unacceptable in the context of high-availability applications.

Yet another problem with conventional crypto management services is that the encrypted data is usually stored in the same location as unencrypted data. This makes handling data backups difficult when there are regulatory requirements for handling archived media containing encrypted data. Further, storing encrypted data in the same location as unencrypted data means the encrypted data is vulnerable to the same data corruption possibilities as the unencrypted data.

It would be beneficial to provide a centralized crypto system that performs various cryptography operations and stores encrypted data for one or more high-availability applications that share data. Such a software system may enable efficient centralized data management and encryption services among one or more high-availability applications.

BRIEF SUMMARY

Briefly described and according to one embodiment, a reference token service is herein described. In one embodiment, the reference token service receives raw data strings from trusted source applications associated with merchants or other users. Upon receipt of a given raw data string, the reference token service then identifies one or more reference token pools corresponding to a merchant that sent the raw data string, wherein each reference token pool includes a plurality of reference tokens with comprising formats and data structures compatible with the merchant. The raw data string is then sent to a crypto system for tokenization. The crypto system returns a crypto token to the reference token service, wherein the crypto token may not satisfy the specific formatting or data requirements of the merchant. The crypto token is then associated with a reference token corresponding to the merchant, and the reference token is provided to the merchant. The merchant is then able to use the reference token amongst various applications within the merchant's system to enable easy sharing and retrieval of the raw data string.

BRIEF DESCRIPTION OF THE DRAWINGS

FIG. 1 depicts a schematic diagram of an illustrative embodiment of an enterprise software environment including a crypto system, according to one or more embodiments of the present disclosure.

FIG. 3 depicts a schematic diagram of an illustrative embodiment of an application receiving application data stored on a crypto system, according to one or more embodiments of the present disclosure.

FIG. 4 depicts a schematic diagram of an illustrative embodiment of an application sharing a token with another application, according to one or more embodiments of the present disclosure.

DETAILED DESCRIPTION

Figure 2A:
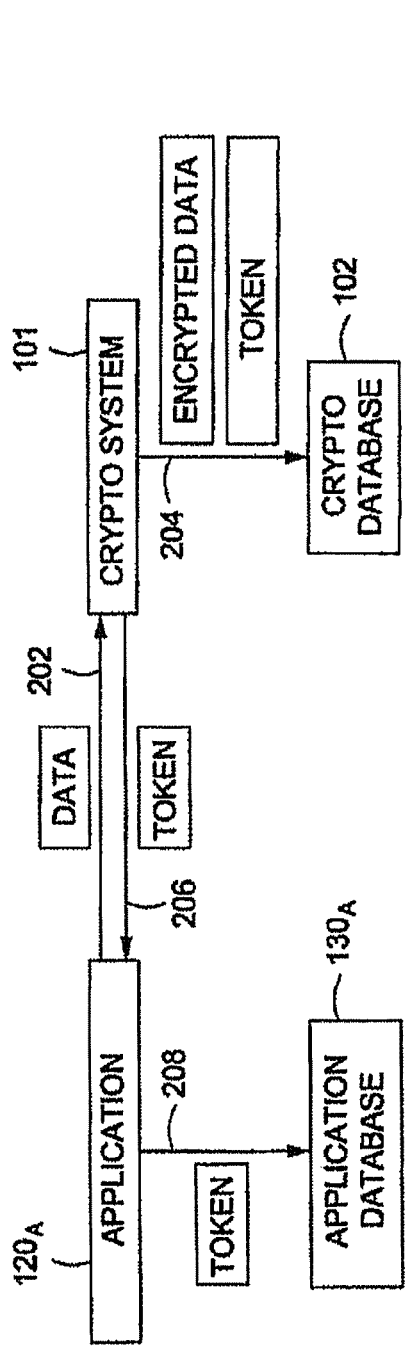
FIG. 2A depicts a schematic diagram of an illustrative embodiment of an application transmitting data to a crypto system and receiving a token from the crypto system, according to one or more embodiments of the present disclosure.

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

In describing selected embodiments, various objects or components may be implemented as computing modules. These modules may be general-purpose, or they may have dedicated functions such as memory management, program flow, instruction processing, object storage, etc. The modules can be implemented in any way known in the art. For example, in one embodiment a module is implemented in a hardware circuit including custom VLSI circuits or gate arrays, off-the-shelf semiconductors such as logic chips, transistors, or other discrete components. One or more of the modules may also be implemented in programmable hardware devices such as field programmable gate arrays, programmable array logic, programmable logic devices or the like.

In an exemplary embodiment, one or more of the modules are implemented in software for execution by various types of processors. An identified module of executable code may, for instance, include one or more physical or logical blocks of computer instructions that may, for instance, be organized as an object, procedure, or function. Further, the executables of an identified module need not be physically located together, but may include disparate instructions stored in different locations that, when joined logically together, include the module and achieve the stated purpose for the module. A "module" of executable code could be a single instruction, or many instructions, and may be distributed over several different code segments, among different programs, and across several memory devices. Similarly, operational data may be identified and illustrated in association with one or more modules, and may be embodied in any suitable form and organized within any suitable type of data structure. The operational data may be collected as a single data set, or may be distributed over different locations including over different storage devices, and may exist, at least partially, as electronic signals on a system or network.

In some embodiments, higher-level components may be used as modules. For example, one module may include an entire computer acting as a network node. Another module may include of an off-the-shelf or custom program, such as a database management system. These higher-level modules may be decomposable into smaller hardware or software modules corresponding to different parts of a software program and identifiable chips (such as memory chips, ASICs, or a CPU) within a computer.

One type of module is a "network." A network module defines a communications path between endpoints and may include an arbitrary amount of intermediate modules. A network module may encompass various pieces of hardware, such as cables, routers, and modems, as well the software necessary to use that hardware. Another network module may encompass system calls or device-specific mechanisms such as shared memory, pipes, or system messaging services. A third network module may use calling conventions within a computing module, such as a computer language or execution environment. Information transmitted using the network module may be carried upon an underlying protocol, such as HTTP, BXXP, or SMTP, or it may define its own transport over TCP/IP, IPX/SPX, Token Ring, ATM, etc. To assure proper transmission, both the underlying protocol as well as the format protocol may split the information into separate pieces, wrap the information in an envelope, or both. Further, a network module may transform the data through the use of one or more computing modules.

FIG. 1 depicts a schematic diagram of an illustrative embodiment of an enterprise software environment 100 including a crypto system 101, according to one or more embodiments of the present disclosure. The crypto system 101 may include a crypto database 102, a cryptography module 106, memory 110, a computer readable medium 111, an application interface 116, and a data rotation service 140.

In at least one embodiment, the crypto database 102 may be a MICROSOFT SQL SERVER implementation operating on a MICROSOFT WINDOWS-based operating system. In another embodiment, the crypto database 102 may be an ORACLE database operating on a MICROSOFT WINDOWS-based operating system. In yet another embodiment, the crypto database 102 may be a PostgreSQL database operating on a LINUX-based operating system. In yet another embodiment, the crypto database 102 may operate on a UNIX-based operating system. It should be understood that the foregoing embodiments are merely examples and that the crypto database 102 may be any database implementation operating on any operating system.

The cryptography module 106 may run on one computer, or it may run on multiple computers for purposes of load balancing and failover. In at least one embodiment, the cryptography module 106 may implement PCI DSS-compliant technology based on the National Institute of Standards and Technology (NIST) Advanced Encryption Standard (AES) cryptography technology. In another embodiment, the cryptography module 106 may implement RSA encryption technology, such as the RC4 algorithm. In yet another embodiment, the cryptography module 106 may implement MICROSOFT cryptography technology, such as the MICROSOFT Crypto API or any other MICROSOFT Cryptographic Service Provider (CSP). In yet another embodiment, the cryptography module 106 may implement protocols that may be used to communicate with encryption hardware 108. For example, the cryptography module 106 may implement the RSA PKCS 11 API. The foregoing are merely examples of cryptography technology that may be used in embodiments of the present disclosure and are not meant to be limiting.

In at least one embodiment, the crypto system 101 may be communicably coupled to encryption hardware 108, such as a network-connected hardware security module (HSM). Further, one or more applications 120A-C may be communicably coupled to the crypto system 101. Three applications 120A-C are depicted in FIG. 1, however, any number of applications 120A-C may exist. The applications 120A-C may be high-availability systems that require minimal down-time.

Each application 120A-C may be communicably coupled to one or more application databases 130A-C. In at least one embodiment, the application databases 130A-C may be MICROSOFT SQL SERVER implementations operating on a MICROSOFT WINDOWS 2003 SERVER operating system. In another embodiment, the application databases 130A-C may be ORACLE databases operating on a MICROSOFT WINDOWS 2003 SERVER operating system. In yet another embodiment, the application databases 130A-C may be PostgreSQL databases operating on a LINUX-based operating system. In yet another embodiment, the application databases 130A-C may operate on a UNIX operating system. It should be understood that the application databases 130A-C may be any database implementation operating on any operating system, and the foregoing embodiments are not meant to be limiting.

In at least one embodiment, the applications 120A-C and the application databases 130A-C may not store sensitive data, such as credit card information or personally identifiably information (PII), locally. Rather, the sensitive data may be stored in the crypto database 102 of the crypto system 101.

An application interface 116 may enable data to be transferred between an application 120A-C and the crypto system 101. Possible application interfaces 116 may include, without limitation, Remote Procedure Calls (RPC) and web services. For example, in one embodiment, the RPC application interface may be a Remote Function Call (RFC), which is an application interface used by SAP systems.

In at least one embodiment, the crypto system 101 may perform centralized data management and/or various cryptographic operations for the applications 120A-C. For example, the crypto system 101 may conduct cryptography functions, such as encryption, mass encryption, decryption, and data rotation. In at least one embodiment, the cryptography module 106 of the crypto system 101 may receive one or more inputs from an application 120A-C via the application interface 116. The inputs may include instructions, a key, and/or data in encrypted or unencrypted form. Upon receiving an input, the cryptography module 106 may perform operations on the data using the key in accordance with the instructions. For example, if data is accompanied by encryption instructions, then the cryptography module 106 may encrypt the data with the key. The encrypted data may be transmitted to the crypto database 102 where it may be stored. In another embodiment, the crypto module 106 may retrieve the encrypted data from the crypto database 102 and decrypt the data. The decrypted data may then be transmitted back to the appropriate application 120A-C.

An advantage of storing encrypted data on a centralized storage system, such as the crypto system 101 is that the centralized storage system may have stronger access control and support for PCI DSS-compliant backups. Another advantage is that a single purge and archival policy may be used for all sensitive data. Yet another advantage is that a wide range of enterprise encryption needs may be supported with the server. Yet another advantage is that different cryptography keys may be assigned to collections of applications with varying data rotation and archival policies. Yet another advantage is that multiple encryption technologies may be simultaneously supported, including, without limitation, software and hardware based cryptography technologies.

The crypto system 101 may periodically perform a key rotation operation. In at least one embodiment, the keys may be stored in the cryptography module 106, and references to the keys may be stored in the crypto database 102. A key rotation operation may include replacing the current active encryption keys with a new active encryption keys. When the crypto system 101 performs a key rotation, the crypto system 101 may also perform a data rotation operation corresponding to the key rotation. In at least one embodiment, the rotation operations occur at fixed intervals. For example, the crypto system 101 may be configured to perform the rotation operations during low-volume periods. In another embodiment, a user of the crypto system 101 may select when to initiate a rotation operation. For example, a user may submit a data rotation operation command to the crypto system 101 from a terminal (not shown) that is communicably coupled to the crypto system 101.

The data rotation service 140 may monitor the crypto system 101 and perform data rotation operations corresponding to key rotation operations. In at least one embodiment, the data rotation service 140 may operate on a single computer that is communicably coupled to the crypto database 102. In another embodiment, the data rotation service 140 may operate on more than one system, thereby allowing clusters of systems to perform operations on partitions of a total data set. It will be understood and appreciated by those of ordinary skill in the art that although the data rotation service 140 is illustrated in FIG. 1 as a component of the crypto system 101, in various other embodiments the data rotation service may be external to the primary crypto system, and may interact with the crypto system via a web service (WS) interface (for example). Accordingly, embodiments of the present system are not limited to the specific embodiments illustrated and discussed herein.

Data rotation may include decrypting data that was encrypted with a previously active key ("stale" data) and re-encrypting the decrypted data with a currently active key to produce "fresh" data. Thus, data rotation ensures that the data stored in the crypto database 102 is always fresh, i.e., encrypted with the currently active key. The data rotation service 140 may utilize the cryptography module 106 to decrypt and encrypt data.

Multiple references to decryption keys may be stored in the crypto database 102, the memory 110, and/or the computer readable medium 111. For example, the crypto database 102, the memory 110, and/or the computer readable medium 111 may include references to decryption keys capable of decrypting stale data. Storing references to decryption keys enables the crypto system 101 to continue processing application 120A-C requests for data even if data rotation is not yet complete. For example, during a data rotation, a partition may contain a combination of stale data and fresh data. Because the crypto system 101 has access to previously active encryption keys and the currently active encryption keys, the crypto system 101 may decrypt both stale data and fresh data. Thus, the crypto system 101 may continue to respond to the application requests for data even if data rotation is not yet complete.

In at least one embodiment, after the application data is encrypted by the cryptography module 106 and stored in the crypto database 102, the crypto system 101 may generate one or more tokens corresponding to the application data. The tokens may be transmitted to the applications 120A-C. The applications 120A-C may store the tokens either locally or in the application databases 130A-C and later use the tokens in place of the application data.

In at least one embodiment, a token is a text string that is 25 characters in length. A sample token is as follows: -VVVV-SSSS-NNNNNNNNNNNNNNC.

In the exemplary embodiment, characters 0, 5, and 10 are a dash "-". Characters 1 through 4 (represented by "V") correspond to a base-16 encoded integer value that may be used to determine the code path to take when evaluating the token during decryption requests. If the length of the unencrypted (or raw) string is between 1 and 4 characters, then characters 6 through 9 (represented by "S") may be blank spaces. If the length of the unencrypted string is more than 4 characters, characters 6 through 9 may represent the last four characters of the unencrypted string. In at least one embodiment, the unencrypted string may be a credit-card number, and characters 6-9 may represent the last four digits of the credit-card number. Zero length strings may not be encrypted.

Characters 11 through 23 (represented by "N") may be a base-32 representation of a 64-bit unsigned number. In at least one embodiment, each character 11 through 23 may be a base 32 value. In at least one embodiment, characters 11-23 may represent a unique identifier that is associated with the encrypted string in the crypto database 102. In other words, characters 11 through 23 may be used to locate the encrypted string in the crypto database 102. Character 24 may be a check digit that is calculated by adding the values of the base-32 characters and representing that value as a modulo 32 number. The tokens may be represented using text-based markup languages, such as XML, to facilitate the transmission of tokens between disparate platforms.

According to an additional embodiment, "flextokens" may be used wherein the format of the token is controlled by a format specifier similar to that used for a printf C API. Use of such "flextokens" allows for easy creation of new formats as needed.

The tokens described herein may provide several benefits. One benefit is that the structure of a token generated by the crypto system 101 may include the last four characters of the encrypted data in unencrypted form. This feature is particularly useful when the encrypted data involves storing a credit card number. For example, in one embodiment, the token may include the last four digits of the encrypted credit card number in unencrypted form. In such an embodiment, the applications 120A-C do not need to submit a request to the crypto system 101 for unencrypted data if the applications 120A-C only need the last four digits of the credit card number. A human operator would be able to read the last four digits of the credit card number simply by examining the token. Moreover, the ability to use application-defined tokens provides flexibility when using applications 120A-C or application databases 130A-C that are legacy systems that do not support the storage of a token defined by the crypto system 101.

FIG. 2A depicts a schematic diagram of an illustrative embodiment of an application 120A transmitting data to a crypto system 101 and receiving a token from the crypto system 101, according to one or more embodiments of the present disclosure. In at least one embodiment, the application 120A may transmit data to the crypto system 101, as shown at 202. Data may be transmitted between the application 120A and the crypto system 101 via the application interface 116 (FIG. 1). The crypto system 101 may receive the data and encrypt the data using the cryptography module 106 (FIG. 1). After the data has been encrypted, the crypto system 101 may transmit the encrypted data to the crypto database 102 for storage, as shown at 204. The crypto system 101 may generate a token corresponding to the encrypted data, and the token may be transmitted to the application 120A, as shown at 206. After receiving the token, the application 120A may store the token in the application database 130A, as shown at 208.

Figure 2B:
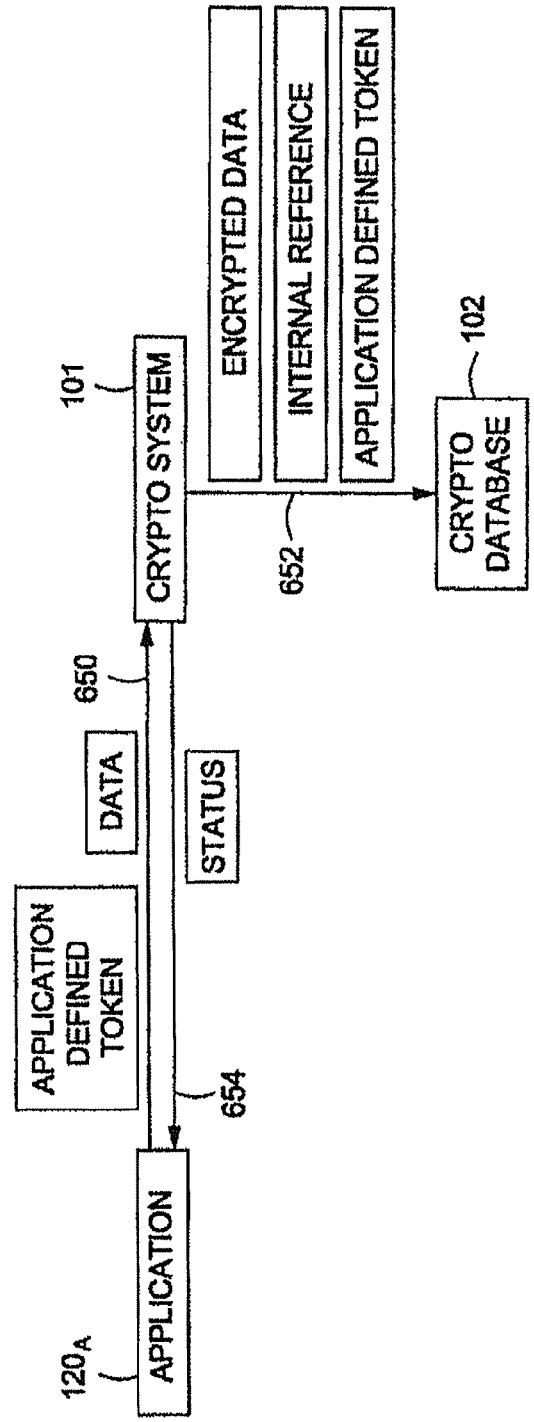
FIG. 2B depicts a schematic diagram of an illustrative embodiment of an application transmitting data and an application-defined token to a crypto system and receiving a status response from the crypto system, according to one or more embodiments of the present disclosure.

FIG. 2B depicts a schematic diagram of an illustrative embodiment of an application 120A transmitting data and an application-defined token to a crypto system 101 and receiving a status response from the crypto system 101, according to one or more embodiments of the present disclosure. In at least one embodiment, the application 120A may transmit data and an application-defined token to the crypto system 101, as shown at 650. The crypto system 101 may receive the data and encrypt the data using the cryptography module 106 (FIG. 1). An internal reference may be generated that associates the encrypted data with the application-defined token. The crypto system 101 may transmit the encrypted data, the application-defined token, and the internal reference to the crypto database 102 for storage, as shown at 652. The crypto system 101 may transmit a status response to the application 120A, as shown at 654.

In certain situations, using an application-defined token, as described with respect to FIG. 2B, may be preferred to using a token defined by the crypto system 101, as described with respect to FIG. 2A. For example, an application 120A may be unable to store a token generated by the crypto system 101. This may occur if the token generated by the crypto system 101 is too large for the fields defined in a table of an application database 130A (FIG. 1), as the application database 130A-C may be part of a legacy system that does not support adding extra columns to its internal tables.

FIG. 3 depicts a schematic diagram of an illustrative embodiment of an application 120A receiving application data stored on a crypto system 101, according to one or more embodiments of the present disclosure. In at least one embodiment, the application 120A may retrieve a token from the application database 130A, as shown at 302. In another embodiment, instead of retrieving a token from the application database 130A, the application 120A may generate an application-defined token. The application 120A may transmit the token to the crypto system 101, as shown at 304. The token may be transmitted from the application 120A to the crypto system 101 via the application interface 116 (FIG. 1). The crypto system 101 may receive the token and retrieve the encrypted data corresponding to the token from the crypto database 102, as shown at 306. The crypto system 101 may decrypt the encrypted data using the cryptography module 106 (FIG. 1). The crypto system 101 may then return the unencrypted data to the application 120A, as shown at 308.

In at least one embodiment, more than one application-defined token may be associated with an encrypted value. For example, the encrypted value may be a credit card number, and one application-defined token may be the social security number of the credit card holder, and a second application-defined token may be an employee identification number of the credit card holder. An Application 120A-C may then submit either the social security number or the employee identification number as a token to the retrieve the encrypted information from the crypto system 101.

FIG. 4 depicts a schematic diagram of an illustrative embodiment of an application 120A sharing a token with another application 120B, according to one or more embodiments of the present disclosure. In at least one embodiment, the application 120A may transmit data to the crypto system 101, as shown at 402. Data may be transmitted between the application 120A and the crypto system 101 via the application interface 116 (FIG. 1). The crypto system 101 may receive the data and encrypt the data using the cryptography module 106 (FIG. 1). After the data has been encrypted, the crypto system 101 may transmit the encrypted data to the crypto database 102 for storage, as shown at 404. The crypto system 101 may generate a token associated to the encrypted data, and the token may be transmitted to the application 120A, as shown at 406. After receiving the token, the application 120A may store the token in the application database 130A, as shown at 408. In at least one embodiment, the application 120A may share the token received from the crypto system 101 with the application 120B, as shown at 410. After the application 120B receives the shared token from the application 120A, the application 120B may store the shared token in application database 130B, as shown at 412.

Figure 5:
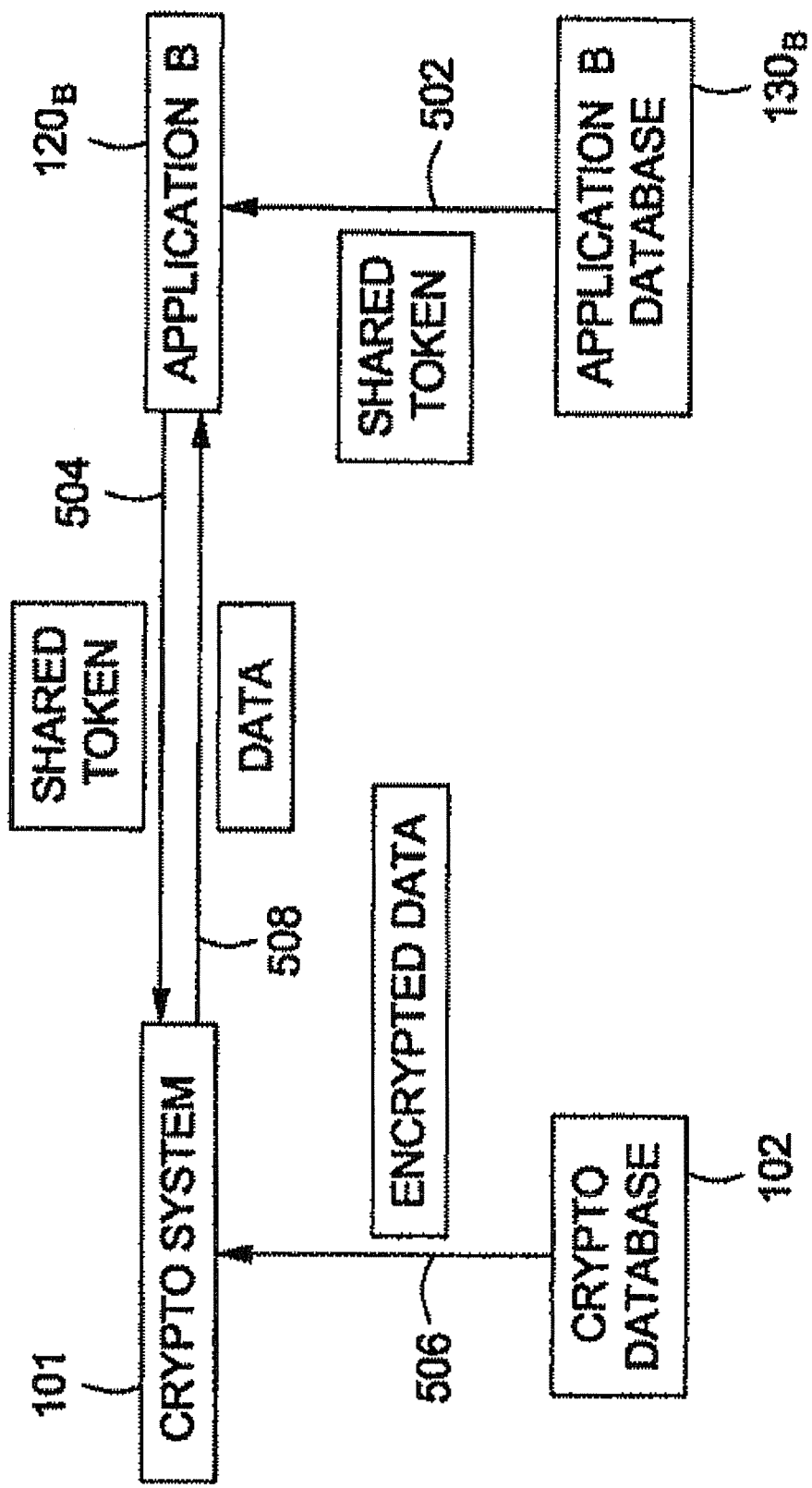
FIG. 5 depicts a schematic diagram of an illustrative embodiment of an application receiving application data stored on a crypto system using a shared token, according to one or more embodiments of the present disclosure.

FIG. 5 depicts a schematic diagram of an illustrative embodiment of an application 120B receiving application data stored on a crypto system 101 using a shared token, according to one or more embodiments of the present disclosure. In at least one embodiment, the application 120B may retrieve a shared token from application database 130B, as shown at 502. For example, the application 120B may have originally received the shared token from the application 120A, as shown in FIG. 4. The application 120B may transmit the shared token to the crypto system 101, as shown at 504. The shared token may be transmitted from application 120B to the crypto system 101 via the application interface 116 (FIG. 1). The crypto system 101 may receive the shared token and retrieve the encrypted data corresponding to the shared token from the crypto database 102, as shown at 506. The crypto system 101 may decrypt the encrypted data using the cryptography module 106 (FIG. 1). The crypto system 101 may then transmit the unencrypted data to the application 120B, as shown at 508.

Figure 6:
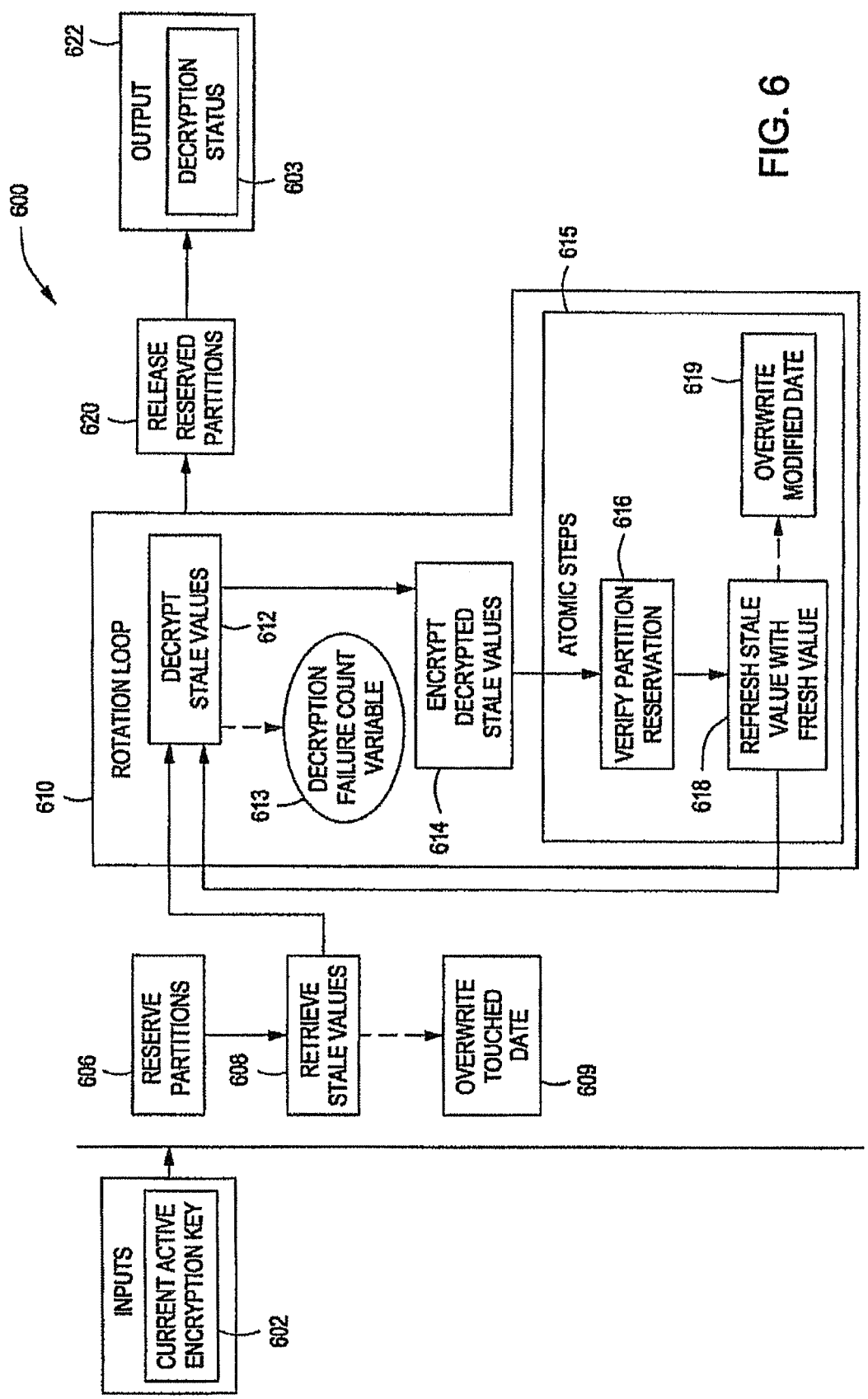
FIG. 6 depicts a schematic diagram of an illustrative embodiment of an algorithm implementing a rotation service, according to one or more embodiments of the present disclosure.

FIG. 6 depicts a schematic diagram of an illustrative embodiment of an algorithm 600 implementing a rotation service, according to one or more embodiments of the present disclosure. A function of the algorithm 600 is to rotate data stored in the crypto database 102. The algorithm 600 may receive one or more inputs, which may include a reference to an active encryption key 602, and output a decryption status 603.

The algorithm 600 may reserve a partition containing stale data stored in the crypto database 102, as shown at 606. Each partition may have an associated partition reservation time. The partition reservation time reflects when the partition was last reserved. When the algorithm 600 reserves a partition, the algorithm 600 may also update the partition reservation time.

The algorithm 600 may retrieve stale values in the reserved partition from the crypto database 102 (FIG. 1), as shown at 608. The algorithm 600 may store the stale values in a data structure (not shown). The data structure may be a one-dimensional array. In at least one embodiment, while retrieving stale values, the algorithm 600 may not modify the reference date of the stale values as they are read. In another embodiment, if the crypto database 102 automatically updates the reference date of the stale values as they are read, the algorithm 600 may note the original reference dates of the stale values before they are read and overwrite the updated reference dates with the original reference dates, as shown at 609.

The algorithm 600 may include a data rotation loop 610. The data rotation loop 610 may decrypt stale values and encrypt the stale values with the current active encryption key to produce fresh values. The algorithm 600 may decrypt a stale value with a decryption key, as shown at 612. If decryption of the stale value is successful, the algorithm 600 may encrypt the decrypted stale value with the current active encryption key to produce a fresh value, as shown at 614. In at least one embodiment, an attempt to decrypt a stale value may fail. For example, a decryption key corresponding to the stale value may not be available on the crypto system 101, or the stale value may be corrupt. Each time a decryption attempt fails, a decryption failure count variable 613 is incremented by one.

The atomic steps 615 may include a verifying step 616 and a refresh step 618. In at least one embodiment, the atomic steps 615 must all complete successfully, and if the atomic steps do not complete successfully, the effects of each atomic step are undone. The algorithm 600 may verify the partition is reserved and update the partition reservation time, as shown at 616. If the partition is no longer reserved, the atomic steps 615 fail. If the partition is still reserved, the algorithm 600 may replace the stale value in the crypto database 102 with a fresh value, as shown at 618. If refreshing the stale value fails, then the atomic steps 615 fail.

In at least one embodiment, the algorithm 600 may not modify the reference date of the stale value when it is refreshed at 618. In another embodiment, the crypto database 102 (FIG. 1) may automatically update the reference date of the stale value when it is refreshed. When this occurs, the algorithm 600 may note the original reference date of the stale value before replacing the stale value with the fresh value, and overwrite the updated reference date with the original reference date, as shown at 619.

The algorithm 600 may release the reserved partition, as shown at 620. The algorithm 600 may then output the decryption status 603, as shown at 622. The output may include a decryption failure count 613, and then the decryption failure count variable 613 may be reset to zero. The algorithm 600 may repeat until all stale data in each partition has been processed.

It should be understood that the above algorithm 600 is merely one embodiment of the present disclosure. Accordingly, other implementations using different data structures and modules may be used. For example, in one embodiment of the algorithm 600, only a subset of the stale values in a partition is retrieved in the data retrieval step 608. In such an embodiment, the algorithm 600 may repeat, each time processing a different subset of stale values in the partition until at least one attempt has been made to refresh each stale value in the partition. The algorithm 600 may then be repeated to process other partitions. The algorithm 600 may repeat until all stale data in all partitions is replaced with fresh data.

Figure 7:
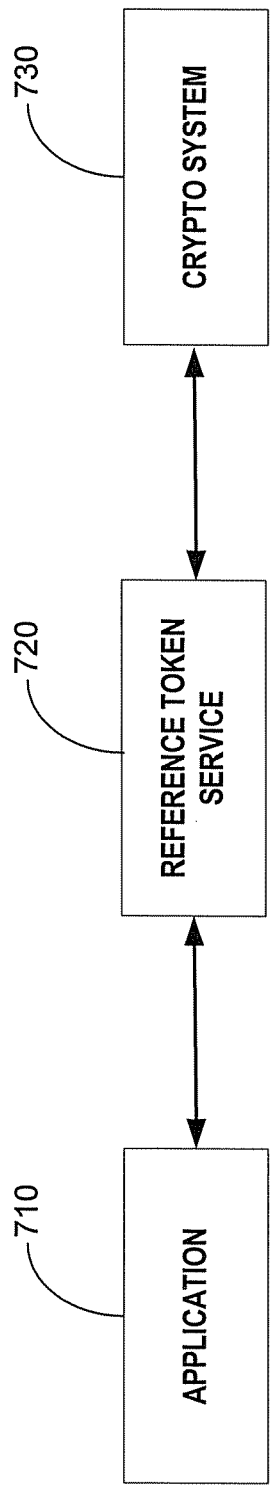
FIG. 7 depicts an illustrative reference token service interposed between an enterprise application and the crypto system, according to one or more embodiments of the present disclosure.

FIG. 7 depicts an illustrative reference token service 720 interposed between an application 710 and a crypto system 730, according to one or more embodiments of the present disclosure. It will be understood and appreciated that, in at least one embodiment, the application 710 is analogous or corresponds to an application 120A-C described previously, and the crypto system 730 is analogous or corresponds to a crypto system 101 described previously. In at least one embodiment, a token generated by the crypto system 730 (i.e., a "crypto token") may include 25 characters: a 14 character alphanumeric core token (13 meaningful characters and a check character) and 11 characters of format and version detail. Each meaningful character may be one of 36 alphanumeric characters. Thus, the 13 meaningful characters in the core token may produce a token space of 36^13 which may effectively ensure no token wraparound/duplication for the life of the product. In other embodiments in which the characters relate to a 64 bit signed integer, the token space is 2^63. However, the data fields of some applications 710 may be too small to accommodate the tokens generated by the crypto system 730. Moreover, the data fields of some applications 710 may have field type restrictions, e.g., numeric characters only, specific format requirements, or validation requirements, such that tokens generated by the crypto system 730 may not be received and stored by the applications 710. A reference token service 720 may act as an intermediary between an application 710 and the crypto system 730. The reference token service 720 may generate tokens that may be specifically formatted to meet the requirements of the application 710. In another embodiment, the reference token service 720 may reformat existing tokens to meet the requirements of the application 710.

The reference token service 720 may have a high runtime performance and high availability. Furthermore, the reference token service 720 may have a strong authentication and access control system. The reference token service 720 may also be adapted to provide services to multiple merchants, and support multiple formats for each merchant. Moreover, the reference token service 720 may be available on demand or be an on-premise service.

Figure 8:
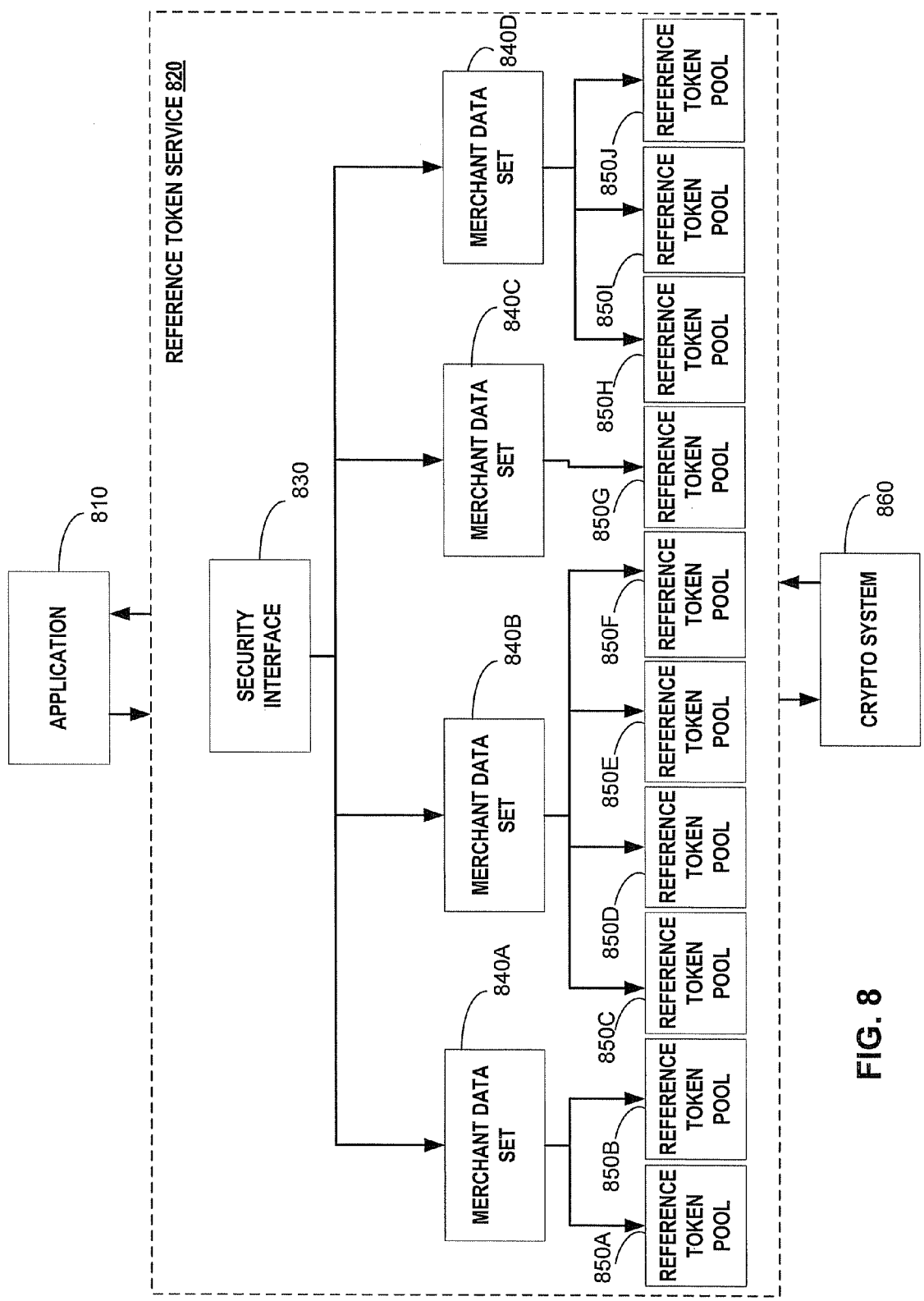
FIG. 8 depicts an illustrative reference token service interposed between an application and the crypto system, according to one or more embodiments of the present disclosure.

FIG. 8 depicts an illustrative reference token service 820 interposed between an application 810 and the crypto system 860, according to one or more embodiments of the present disclosure. Similarly to the components described in connection with FIG. 7, it will be understood and appreciated that, in at least one embodiment, the application 810 is analogous or corresponds to an application 120A-C or 710 described previously, and the crypto system 860 is analogous or corresponds to a crypto system 101 or 730 described previously. High bandwidth communication and low latency may exist between the reference token system 820 and the crypto system 860. In at least one embodiment, the reference token service 820 may include a security interface 830, one or more merchant data sets 840A-D (four are shown), and one or more reference token pools 850A-J (ten are shown) associated with each merchant data set 840A-D. In at least one embodiment, the security interface 830 may include an Apache http server, a web service, and a WS-security ACL program. The web services and WS-security program may provide strong authentication and access control.

In at least one embodiment, the reference token service 820 may include one or more data sets 840A-D, each assigned to a particular merchant. For example, a first data set 840A may be assigned to a first merchant, and a second data set 840B may be assigned to a second merchant. Although four data sets 840A-D are shown, any number of data sets 840A-D may be stored in the reference token service 820. Additionally, as will be understood and appreciated, although the term "merchant" is used herein, it will be understood that end users of the present system need not be "merchants," but may represent any entity that requires use of tokens in connection with data security.

In at least one embodiment, each data set 840A-D may include one or more reference token pools 850A-J. For example, the first data set 840A may include two reference token pools 850A,B, and the second data set 840B may include four reference token pools 850C-F. Any number of reference token pools 850A-J may be associated with each data set 840A-D. Each reference token pool 850A-J may correspond to a particular type and/or format of data designated by the merchant. For example, reference token pool 850A may correspond to social security numbers, and reference pool 850B may correspond to credit card numbers.

One or more reference tokens may be pre-generated and stored in each reference token pool 850A-J. In at least one embodiment, a format specific executable or code may be used to populate a reference token pool 850A-J with pre-generated reference tokens. The format specific executable may be used to generate reference tokens having specific token attributes provided by the merchant. In at least one embodiment, token attributes may include the total length of the token, i.e., the number of characters, whether the characters are numeric or alphanumeric, whether any of the characters are embedded characters containing any of the original data, or any other fixed formatting requested by the merchant. For example, a merchant may design or request an executable that populates a reference token pool 850A-J with pre-generated reference tokens that have less than 25 characters, thereby allowing the reference tokens to be received and stored by an application 810 that is unable to store 25 character tokens.

In at least one embodiment, a format specific executable may exist for each reference pool 850A-J. For example, a first format specific executable may be used to pre-generate reference tokens in a first reference pool 850A corresponding to social security numbers and having nine numeric characters, and a second format specific executable may be used to pre-generate tokens in a second reference pool 850B corresponding to credit card numbers and having 16 alphanumeric characters. In at least one embodiment, the pre-generation of tokens is an off-line administrative process. In another embodiment, the pre-generation of tokens is conducted in the background while the reference token system 820 is on-line.

In operation, a merchant may use the application 810 to make a call to the reference token service 820 and request the tokenization of a raw string of data. The raw string may include between one and twenty five characters. In at least one embodiment, the raw string may include, but is not limited to, data representing social security numbers, credit card numbers, personally identifiable information, human resources information, medical records, prescription numbers, bank account numbers, or other data to be protected.

The security interface 830 may receive the call from the application 810, and the WS security program may authenticate the caller as a valid end-point by checking a WS security certificate belonging to the merchant and/or application 810. The WS security certificate may also identify the data set 840A-D within the reference token service 820 assigned to the merchant. The WS security certificate may also define the allowable operations, which may include, but are not limited to, tokenization, detokenization, deleting a token, and checking the existence of a token or data. In at least one embodiment, the WS security certificate may include a X.509 certificate.

If the caller is authenticated, the reference token service 820 may transmit the raw string to the crypto system 860 for tokenization. The crypto system 860 may encrypt the raw string and generate a crypto token. As referred to herein, a "crypto token" is a token generated by the crypto system 101, 730 or 860, and that may or may not meet specific formatting requirements of an end application. The encrypted raw string may be stored in a database in the crypto system 860, such as the crypto database 102 shown in FIG. 1. In at least one embodiment, the crypto token may include twenty five characters. The crypto token may be transmitted to the reference token service 820 where it may be persisted (stored in a database) by the reference token service 820.

The application 810 may identify a particular reference token pool 850A-J from which to select a reference token with pre-generated attributes. A reference token from the specified reference token pool 850A-J may be associated with the crypto token that is received and persisted, and the reference token may then be transmitted to the application 810. In at least one embodiment, the reference token may be modified before being transmitted to the application 810. In an exemplary embodiment, the pre-generated reference token may have predetermined attributes corresponding to a social security number, such as nine numeric characters. The reference token may be modified such that the last four characters of the reference token are embedded with the last four digits of the social security number. In another exemplary embodiment, the pre-generated reference token may have predetermined attributes corresponding to a credit card number, such as sixteen alphanumeric characters. The reference token may be modified such that the last four characters of the reference token are embedded with the last four digits of the original credit card number. The foregoing embodiments are merely examples of modified reference tokens are not meant to be limiting.

After a merchant receives a reference token, the reference token may be transmitted (shared) from one application 120A to another application 120B, as seen in FIG. 4. A second application 120B may then retrieve the raw data from the crypto system 960, as seen in FIG. 5.

In at least one embodiment, a masked value may also be transmitted from the reference token service 820 to the application 810. The masked value may provide a convenient way for a merchant to retrieve and submit a desired portion of data so that a merchant does not have to retrieve a reference token from an application database or retrieve the encrypted data from the crypto system 860. The masked value may include one or more characters from the raw string along with one or more masking characters. In an exemplary embodiment, the masked value may include a portion of a credit card number, such as the last four digits. The masked value may also include masking characters, such as the "*" character, that replace the remaining credit card numbers. A sample masked value may look like: ************1234.

In at least one embodiment, a status indicator may be transmitted from the crypto system 860 or the token reference service 820 to the application 810. Possible status indications may include successful, failure—token exists (in the crypto system 860), failure—invalid parameters (like no such token type), failure—reference token system 820 unavailable or unreachable, and failure—reference token unavailable.

A merchant may also be able to detokenize, i.e., return the reference token in exchange for the original raw string of data, delete a particular token, or check for the existence of a particular token. In at least one embodiment, a merchant may want exchange the reference token for the original raw string of data. The merchant may place a call from the application 810 to the reference token service 820. The security interface 830 may receive the call from the application 810. The WS security program may authenticate the caller as a valid endpoint by checking a WS security certificate belonging to the merchant and/or application 810. The WS security certificate may also identify the data set 840A-D within the reference token service 820 assigned to the merchant. After the application 810 has been authenticated, it may transmit the reference token to the reference token service 820. In at least one embodiment, the reference token will be stored in the reference token pool 850A-F from which it was originally retrieved so that it may be used again. In another embodiment, the reference token may be deleted after it identifies the crypto token with which it is associated. In another embodiment, the crypto token may be re-formatted by the executable for a particular reference token pool 850A-J and placed back in the pool 850A-J.

The reference token service 820 may retrieve the crypto token associated with the reference token. The crypto token may be transmitted to the crypto system 860. The crypto system 860 may decrypt the encrypted raw string associated with the crypto token, thus producing the original raw string and transmit the original raw string to the application 810.

Figure 9:
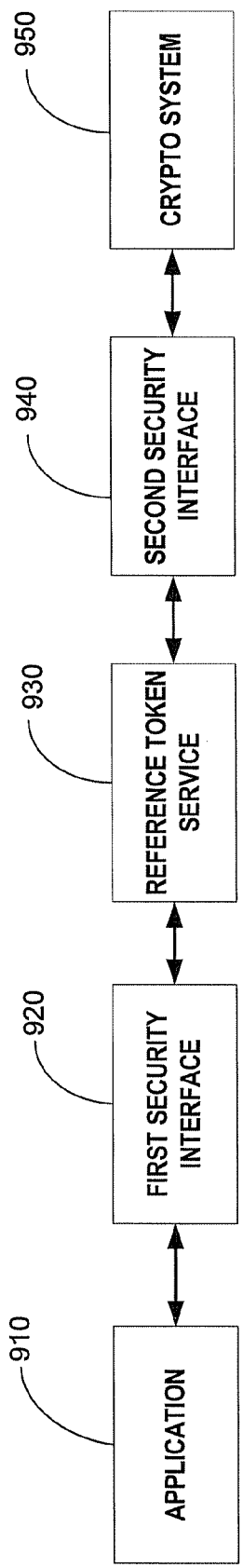
FIG. 9 depicts a first security interface interposed between an application and the reference token system and a second security interface interposed between the reference security system and the crypto system, according to one or more embodiments of the present disclosure.

FIG. 9 depicts a first security interface 920 interposed between an application 910 and the reference token system 930 and a second security interface 940 interposed between the reference token system 930 and the crypto system 950, according to one or more embodiments of the present disclosure. In at least one embodiment, at least one of the first security interface 920 and the second security interface 940 may include an Apache http server, a web service, and a WS security program.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A method for utilizing reference tokens to enable sharing of sensitive data amongst a plurality of applications associated with one or more merchants, comprising the steps of:
    receiving a particular item of sensitive data at a reference token service, wherein the particular item of sensitive data is of a particular data type comprising a particular format, and wherein the particular item of sensitive data is received from a trusted source application associated with a particular merchant;
    identifying at the reference token service one or more reference token pools corresponding to the particular merchant, wherein each reference token pool includes a plurality of reference tokens each having a specific format corresponding to a respective sensitive data type utilized by the particular merchant;
    identifying at the reference token service a particular reference token pool from the identified one or more reference token pools based on the particular format of the received particular item of sensitive data;
    transmitting the particular item of sensitive data from the reference token service to a crypto system for tokenization;
    receiving a crypto token corresponding to the particular item of sensitive data at the reference token service from the crypto system;
    associating the crypto token received from the crypto system with a particular reference token selected from the particular reference token pool; and
    transmitting the particular reference token to the trusted source application,
whereby the trusted source application is able to share the particular reference token with other trusted source applications associated with the particular merchant.

2. The method of claim 1, wherein the particular merchant specifies to the reference token service one or more sensitive data types and one or more data formats utilized by the particular merchant.

3. The method of claim 1, wherein the one or more reference token pools are stored in a database associated with the reference token service.

4. The method of claim 1, wherein the plurality of reference tokens are preexisting.

5. The method of claim 1, wherein the particular reference token is generated on-the-fly after the crypto token is received from the crypto system.

6. The method of claim 1, wherein the crypto-token is merchant agnostic.

7. The method of claim 1, further comprising the step of modifying the particular reference token to include one or more predetermined attributes.

8. The method of claim 7, wherein the one or more predetermined attributes are selected from the group comprising: a portion of the in the particular reference token, a predetermined identifier in the particular reference token, a routing number in the particular reference token.

9. The method of claim 1, further comprising the step of transmitting a masked value to the trusted source application along with the particular reference token.

10. The method of claim 9, wherein the masked value comprises one or more characters from the particular item of sensitive data and one or more masking characters.

11. The method of claim 1, further comprising the step of prior to transmitting the particular item of sensitive data to the crypto system for tokenization, verifying that the trusted source application is a known application associated with a trusted merchant.

12. The method of claim 7, wherein the one or more predetermined attributes are pre-stored in a database at the reference token service.

13. The method of claim 7, wherein the one or more predetermined attributes comprise specific token formatting or data requirements associated with the user.

14. The method of claim 13, wherein the specific token formatting or data requirements are dictated by the user.

* * * * *